April 8, 1958  E. EPPS  2,829,794
PROTECTIVE CONTAINER HOLE COVER
Filed Aug. 6, 1956
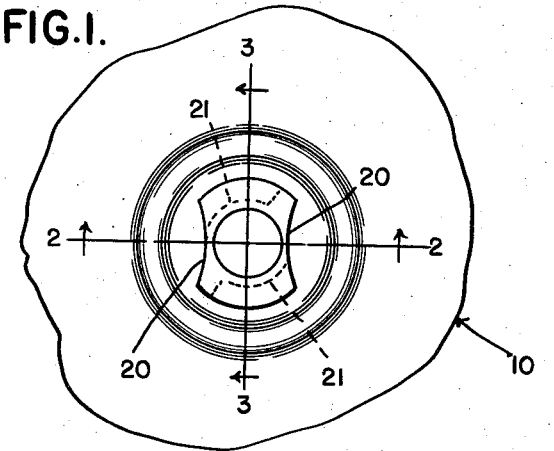
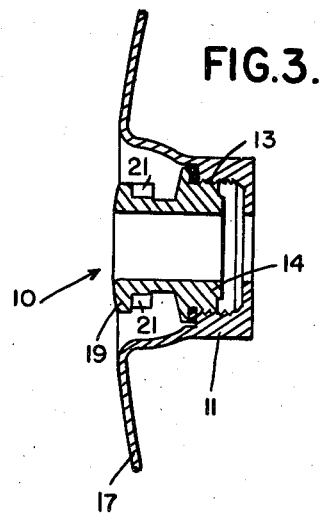
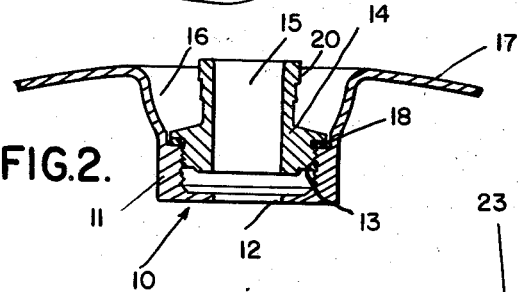
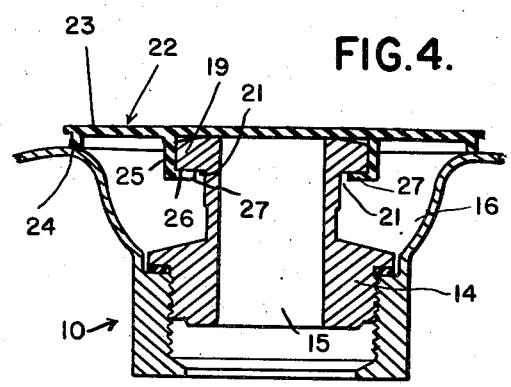
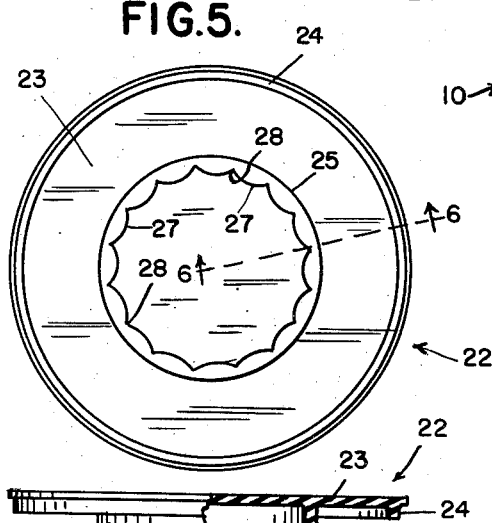
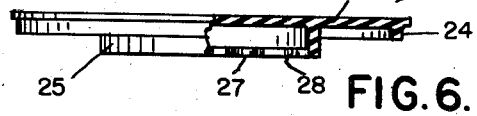
INVENTOR.
ELIAS EPPS
BY Whittemore Hulbert
Belknap
ATTORNEYS United States Patent Office 2,829,794
Patented Apr. 8, 1958

2,829,794

PROTECTIVE CONTAINER HOLE COVER

Elias Epps, Grosse Pointe, Mich.

Application August 6, 1956, Serial No. 602,376

1 Claim. (Cl. 220—24)

The present invention relates to an improved protective cover of plastic material for the bung or tap hole of a barrel or like container for beverages, such as beer.

It is an object of the invention to provide container closure structure for a beverage barrel or the like, including an improved plastic cover which, by reason of the inherent flexibility of its material, as well as improved structural features, has a far better action in gripping the bung or tap hole fitting or fixture of the container, while sealing across an enlarged open mouth to which said fitting is applied, so as to resist accidental displacement and thereby protect the zone in question against contamination and/or possible damage to or displacement of a stopper applied to the tap hole.

More specifically, it is an object of the invention to provide tap hole structure as described, including a cover of the type referred to which is fabricated in its entirety of an inexpensive, cheaply molded plastic material, featuring an enlarged, radially flanged outer disk of substantial diameter adapted to seal across the opening which receives the tap fixture, exerting a resilient, inwardly flexing force against the area surrounding that opening, and an integral, axially extending holding sleeve concentric with and inwardly of the periphery of said disk, which sleeve has snap retaining action over an outwardly projecting, shaped mouth of the tap hole fixture to hold the cover firmly, though releasably, in its sealing position.

In accordance with a still more specific object, the invention provides an improved plastic cover of the character described, in which the sleeve holding portion is provided at its inner terminal annular lip with a circumferential series of radially inwardly projecting scallops or corrugations. These are of such an outline and circumferential spacing as to facilitate application of the cover to the tap hole fixture in practically any position in which the cover is held in a person's hand. The projections or teeth of the corrugations snap inwardly past a flanged lip portion of the tap hole fixture, thus exerting a positive restraining action against accidental displacement of the cover. Yet the corrugations or scallops of the internal sleeve extremity render it sufficiently flexible to enable the cover to be readily dislodged from the fixture by simply lifting up an edge of its outer, radially larger sealing disk. As applied to the fixture, the disk and integral holding sleeve thereof are relatively undistorted, as compared with existing container closures of a generally comparable nature.

The foregoing as well as other objects will be made more apparent as this description proceeds, especially when considered in connection with the accompanying drawings, wherein:

Fig. 1 is a fragmentary plan view of a tap hole structure of the type commonly applied to steel beer barrels and like containers, to which structure the improved cover of my invention is to be applied.

Figs. 2 and 3 are, respectively, fragmentary views in section along lines 2—2 and 3—3 of Fig. 1;

Fig. 4 is a fragmentary view in section similar to Fig. 3, showing the tap structure thereof with the improved cover of the invention operatively applied thereto;

Fig. 5 is a plan view showing the inner or rear side of the improved cover; and

Fig. 6 is an elevational view partially broken away and in section along line 6—6 of Fig. 5.

The reference numeral 10 generally designates a conventional tap hole structure as commonly applied to a steel beer or beverage container. It consists of an annular steel body 11, centrally apertured at 12 and counterbore-threaded at 13 to receive a tap hole fixture 14, with the bore 15 of the latter coaxial. A stopper or cork (not shown) is normally applied to this bore. The body 11 has an enlarged, outwardly disposed well 16 surrounding the fixture 14 and is flanged or flared outwardly at 17 to a substantial diameter. In the operative position of the fixture 14 a sealing washer or gasket 18 is compressed between the same and an annular internal ledge of the body 11. The structure is conventional in all respects.

The fixture 14 is also conventionally characterized by an outer, radially flanged lip 19 which is recessed at diametrically opposed arcuate zones 20, and at 90° to these zones the lip 19 is under-cut in a given circumferential direction, as indicated at 21, to couple to a beverage line when the container is tapped.

The improved cover of the invention appears in Figs. 4, 5 and 6 of the drawings, and is generally designated by the reference numeral 22. It is fabricated throughout of a flexible synthetic plastic material such as polyethylene or like elastomeric plastic of polyethylene or vinyl derivation.

Structurally, the cover 22 includes an outer, relatively flat disk 23 of circular outline and of sufficient diameter to outwardly over-tend the flange 17 of the steel body member 11. An axially inwardly extending shoulder 24 of relatively small thickness is integrally formed on the cover 22 adjacent and inwardly of its outer periphery; and the shoulder 24 has sealing engagement with the flange 17 under flexing stress set up in the disk 23 when the cover is applied to the fixture in the fashion shown in Fig. 4.

In substantially inwardly spaced relation to the shoulder 24, thus to over-span the annular well area surrounding fixture 14, the cover 22 carries an integral inwardly extending holding sleeve 25 of circular outline, whose inner diameter substantially equals the outer diameter of fixture lip 19, so as to have a snugly telescoped fit over the latter when applied. The axial holding sleeve 25 is continuous in its circumferential extent. At its axially inner terminus a restraining lip or shoulder 26 is integrally formed on the sleeve 25, the axial spacing of this lip from the disk 23 of cover 22 being substantially equal to the axial dimension of the fixture lip 19 at its undercut portions 21. Thus, in the applied condition of the cover 22, the lip 26 will have direct retaining engagement with the under or inner surface of the lip under-cut, as shown in Fig. 4; this provides a positive interlock against inadvertent displacement of the cover, and, moreover, places the disk 23 under the desired flexure to maintain sealing engagement of its annular shoulder 24 with the flange 17.

In accordance with the improvement of the invention, the holding lip 26 is corrugated or serrated around its inner circumferential edge, as best illustrated in Fig. 5 of the drawings. The formation is such as to provide relatively mildly rounded, inwardly facing holding teeth, scallops or corrugations 27, closely spaced and distributed uniformly from one another in the circumferential sense by the outward indentations 28 which as illustrated are disposed in immediate succession. Thus, a desired local flexibility is imparted to the lip 26, which despite its effective holding action is thus rendered readily separable manually, when desired, from the fixture 14. This is accomplished by simply inserting a finger beneath the cover disk 23 and lifting.

By reason of the improvements no particular care need be exercised in positioning the cover for application to the fixture 14. The scalloping of the lip 26 assists the sleeve 25 in slipping over the largest diameter of the lip 19, and following this, practically all of the scallops 27 snap inwardly in the under-cut zone at 21 (Fig. 4) to produce a positive grip on the fixture. The local flexibility imparted to lip 26 by the scallops makes the sleeve 25 and lip 26 readily flexible to dislodge the cover for removal, when its disk 23 is lifted as described.

The improved cover is inexpensively produced, and is rugged in construction, so as to resist damage throughout repeated rough usages.

What I claim as my invention is:

Tap hole structure for a beverage barrel or like container, comprising a tap hole fixture and a cover removably applied in external sealing relation thereto, said fixture comprising a rigid metal body in fixed relation to said barrel having an external annular surface of substantial diameter exposed outwardly of said container and a central aperture in coaxial, inwardly offset relation to said exposed surface, a tubular fixture element fixedly secured to said body to provide an outwardly opening bore coaxial with said body aperture, said fixture element projecting outwardly toward said body surface within an annular well of substantial radial width and axial depth between the same and said surface, said fixture element having a radially outwardly flanged outer lip which is radially relieved on opposite diametral sides thereof, said cover being fabricated in one piece of a flexible-non-metallic material and comprising an outer, relatively flat disk of area sufficient to radially outwardly span said well and overlap said outwardly exposed body surface, and an integral annular retaining sleeve on the inner surface of said disk, said sleeve terminating in a radially inturned retaining flange which is formed to provide a series of scallops of mildly rounded contour engaging rearwardly of and having snap-on engagement with said lip of said fixture element, said cover disk being provided with an integral annular rearwardly extending bead outwardly concentric with said retaining sleeve which has rearward edge sealing engagement with said exposed body surface of said fixture radially outwardly of said well, with said disk under substantial axial flexing stress due to said snap-on engagement of said sleeve on said fixture element.

References Cited in the file of this patent

UNITED STATES PATENTS

| | | |
|---|---|---|
| 888,922 | Pendergast | May 26, 1908 |
| 1,081,281 | Tyler | Dec. 9, 1913 |
| 2,271,943 | Klein et al. | Feb. 3, 1942 |
| 2,587,327 | Jesnig | Feb. 26, 1952 |
| 2,775,372 | Jordan | Dec. 25, 1956 |